United States Patent
Chen

(10) Patent No.: US 6,322,092 B1
(45) Date of Patent: Nov. 27, 2001

(54) STRUCTURE FOR A STEERING SPINDLE SECURING DEVICE

(75) Inventor: Tsang-Ying Chen, Chang Hua Hsien (TW)

(73) Assignee: Melton International, LLC, Dover, DE (US)

(*) Notice: Subject to any disclaimer, the term of this patent is extended or adjusted under 35 U.S.C. 154(b) by 0 days.

(21) Appl. No.: 09/749,452

(22) Filed: Dec. 28, 2000

(51) Int. Cl.[7] .................................................. B62K 21/18
(52) U.S. Cl. .......................... 280/279; 74/551.1; 403/370; 384/517
(58) Field of Search ..................... 280/276, 279, 280/280, 275, 274; 74/551.2, 551.1, 551.8; 403/365, 367, 368, 370, 371, 374.4, 373; 384/517, 538

(56) References Cited

U.S. PATENT DOCUMENTS

| | | | |
|---|---|---|---|
| 4,593,924 | * | 6/1986 | Cabeza ................................. 280/279 |
| 5,267,485 | * | 12/1993 | Chi ................................. 280/279 X |
| 5,303,611 | * | 4/1994 | Chi ................................. 74/551.1 |
| 5,332,245 | * | 7/1994 | King ................................. 280/279 |
| 5,454,281 | * | 10/1995 | Chi ................................. 74/551.1 |
| 5,496,126 | * | 3/1996 | Lin ................................. 74/551.1 |

* cited by examiner

Primary Examiner—J. J. Swann
Assistant Examiner—F. Zeender
(74) Attorney, Agent, or Firm—Browdy and Neimark

(57) ABSTRACT

An improved structure for a steering spindle securing device includes a movable fitting element mounted on a steering spindle of a conventional bicycle or scooter and having a notch extending axially along a peripheral wall thereof, one end of the movable fitting element having a generally wedge-shaped press portion for abutting against an inner ring of a bearing of a front head bowl of the bicycle or scooter, an outer annular wall thereof being provided with an outer thread; a generally tubular fixed fitting element having a notch extending axially along the peripheral wall thereof, a retaining hole extending transversely through the notch, and an inner thread for engaging at least a portion of the outer thread on the movable fitting element; and a retaining element that extends through the retaining hole to secure the fixed fitting element on the steering spindle at a predetermined position such that the movable fitting element, when rotated, displaces along the axis of the steering spindle of the bicycle or scooter.

3 Claims, 4 Drawing Sheets

U.S. 6,322,092 B1

STRUCTURE FOR A STEERING SPINDLE SECURING DEVICE

BACKGROUND OF THE INVENTION (a) Field of the Invention

The invention relates to a steering structure of a bicycle or scooter, more particularly to an improved structure for a steering spindle securing device of a bicycle or scooter.

(b) Description of the Prior Art

In the prior art, the steering mechanism of a conventional scooter in general follows the design of steering mechanisms of bicycles. The structure thereof generally includes a steering spindle 60. Referring to FIG. 1, the outer side of the body of the steering spindle 60 has an outer thread, the bottom end having a wheel frame 62 for mounting pivotally a front wheel. The steering spindle 60 is accommodated within a spindle sleeve 70. The spindle sleeve 70 has upper and lower ends provided with two bearings 71. The outer ring 711 of the two bearings 71 are in tight fit with the spindle sleeve 70, while the inner ring 712 is in tight fit with the spindle 60. A press element 81 is threadedly coupled to the outer thread 61 of the steering spindle 60, and has a bottom end having a generally wedge-shaped press portion 811 for vertically pressing against the inner ring 712 of the bearing 71. An adjusting nut 82 is threadedly coupled to the outer thread 61 of the steering spindle 60 and located above the press element 81. By turning the adjusting nut 82 to adjust the size of the pressure exerted by the press element 81 on the inner ring 712 of the bearing 71, smooth rotation of the spindle 60 can be controlled. Besides, the press element 81 can be prevented from rotation relative to the outer thread 61 of the steering spindle 60. Finally, a control rod 90 is connected to the outer end of the spindle 60, and a positioning element is used to secure the control rod 90 and the spindle 60 to thereby enable the user to turn the control rod 90 for control steering of the scooter.

In the above steering structure, during assembly of the components, since the press element 81 and the adjusting nut 82 are threadedly coupled to the outer thread 61 of the spindle 60 and since the outer thread 61 of the spindle 60 is formed by the use of a special lathe, the manufacturing process is troublesome and costs are high.

SUMMARY OF THE INVENTION

The object of this invention is to provide an improved structure for a steering spindle securing device which provides an alternative pivotal connection between a steering spindle and a spindle sleeve of a conventional bicycle or scooter, the connection being simpler in construction.

In order to achieve the above object, an improved structure for a steering spindle securing device of this invention includes a movable fitting element mounted on a steering spindle of a conventional bicycle or scooter and having a notch extending axially along a peripheral wall thereof, one end of the movable fitting element having a generally wedge-shaped press portion for abutting against an inner ring of a bearing of a front head bowl of the bicycle or scooter, an outer annular wall thereof being provided with an outer thread; a generally tubular fixed fitting element having a notch extending axially along the peripheral wall thereof, a retaining hole extending transversely through the notch, and an inner thread for engaging at least a portion of the outer thread on the movable fitting element; and a retaining element that extends through the retaining hole to secure the fixed fitting element on the steering spindle at a predetermined position such that the movable fitting element, when rotated, displaces along the axis of the steering spindle of the bicycle or scooter.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
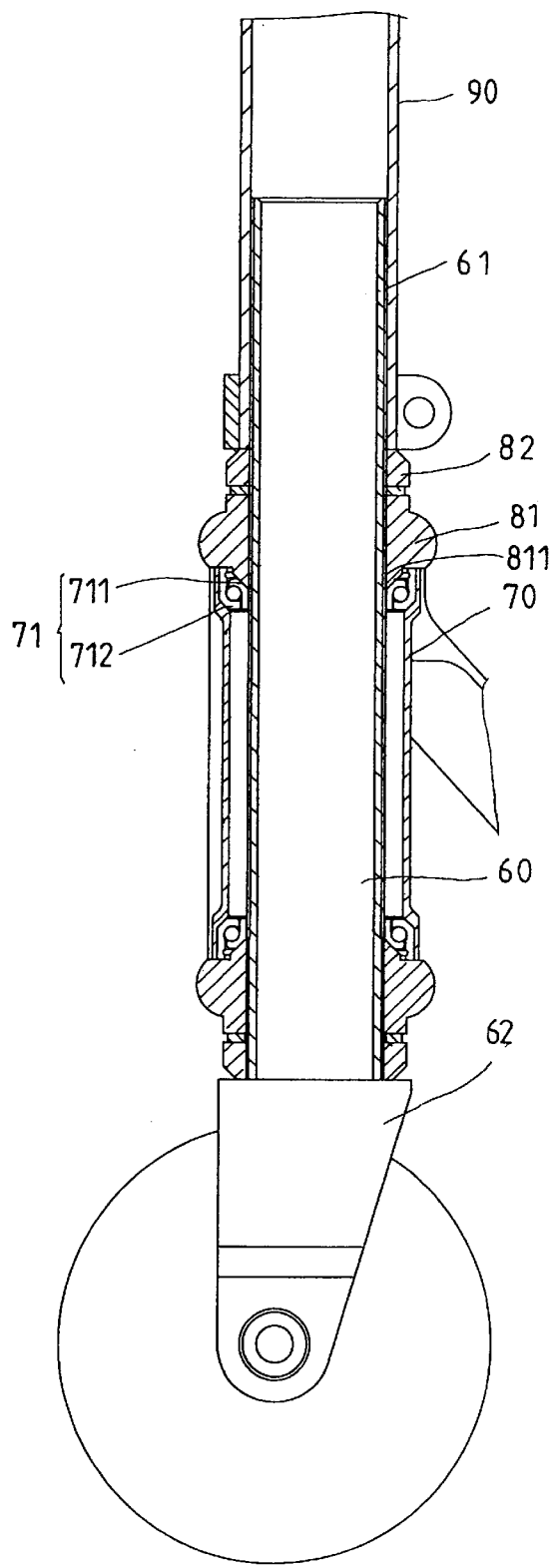
FIG. 1 is a schematic view of the structure of a conventional steering spindle securing device.
Figure 2:
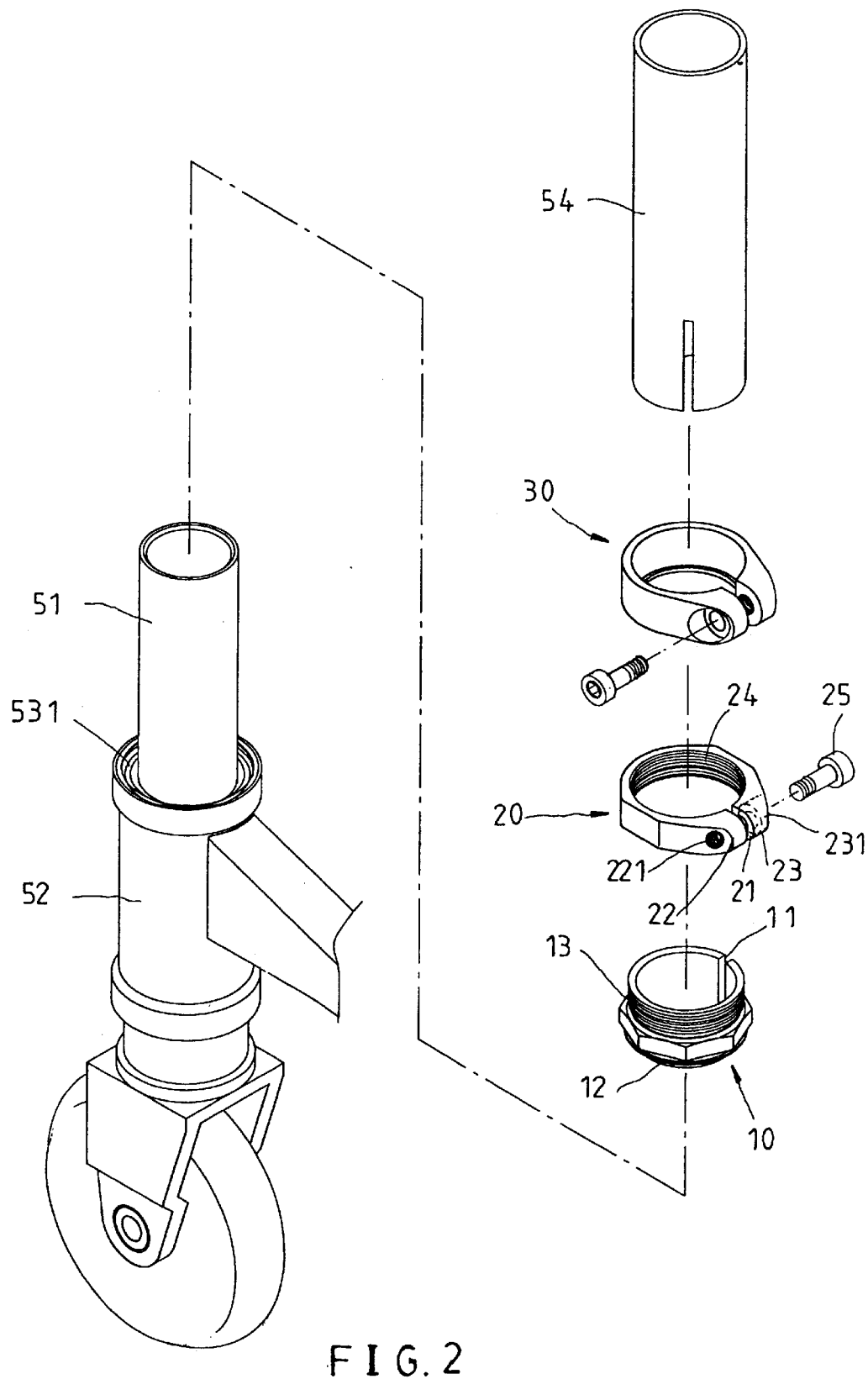
FIG. 2 is an exploded perspective view of the preferred embodiment of this invention.
Figure 3:
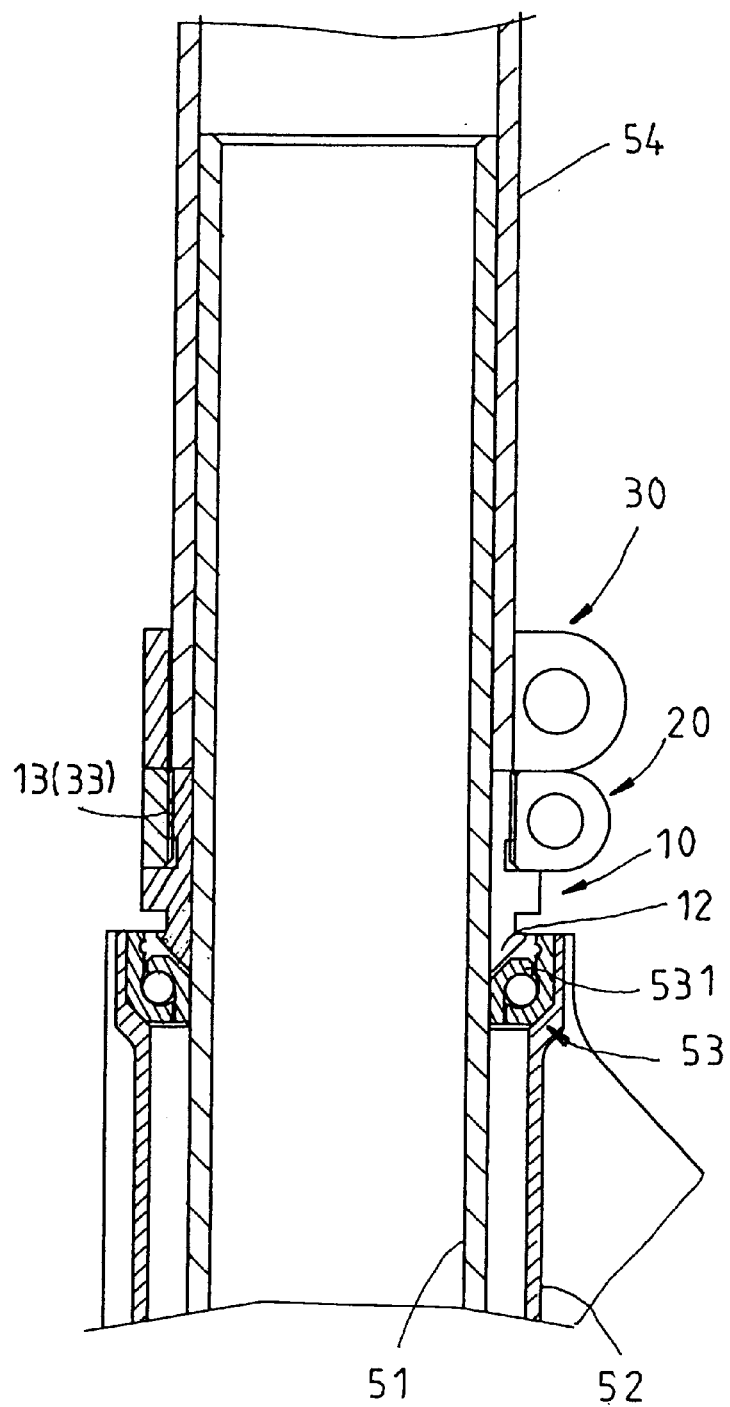
FIG. 3 is an assembled sectional view of the preferred embodiment.

Referring to FIGS. 2 and 3, the preferred embodiment of an improved structure for a steering spindle securing device provided by this invention is located above the front head bowl of the bicycle or scooter, and includes movable and fixed fitting elements 10, 20. The movable fitting element 10 is substantially tubular and has a body with a notch 11 that cuts the movable fitting element 10 along an axial direction. One end of the movable fitting element 10 has a generally wedge-shaped press portion 12. The outer annular wall thereof is provided with an outer thread 13, and a polygonal clamping portion 14 projecting outwardly therefrom.

The fixed fitting element 20 is generally tubular and has a body with a notch 21 that cuts the fixed fitting element 20 axially. Two sides of the notch 21 project outwardly to form lugs 22, 23, respectively. The lugs 22, 23 respectively have a screw hole 221 and an eyelet hole 231. The screw hole 221 and the eyelet hole 231 extend transversely through the notch 21. The inner annular wall of the fixed fitting element 20 has an inner thread 24 for engaging the outer thread 13 of the movable fitting element 10. A retaining element 25, which is a screw bolt in this embodiment, is extendable into and lockable in the eyelet hole 231 and the screw hole 221.

During assembly, the movable fitting element 10 is first mounted on a steering spindle 51 of a scooter. The steering spindle 51 extends out of a spindle sleeve 52 of the scooter. Then, the press portion of the movable fitting element 10 is caused to correspondingly press against an inner ring 531 of a bearing 53 at the upper end of the spindle sleeve 52. Subsequently, the fixed fitting element 20 is threadedly coupled to the outer thread 13 of the movable fitting element 10. The retaining element 25 is then locked in position such that the fixed fitting element 20 and the movable fitting element 10 are secured on the steering spindle 51 of the scooter, i.e. the steering spindle and spindle sleeve of the scooter are caused to couple pivotally. Finally, a control rod 54 of the scooter is connected to the outer end of the spindle 51, and the control rod 54 and the steering spindle 51 are coupled firmly by using a positioning element 30 (of a known structure so that a description thereof is dispensed with herein) mounted on the outer end of the control rod 54.

Figure 4:
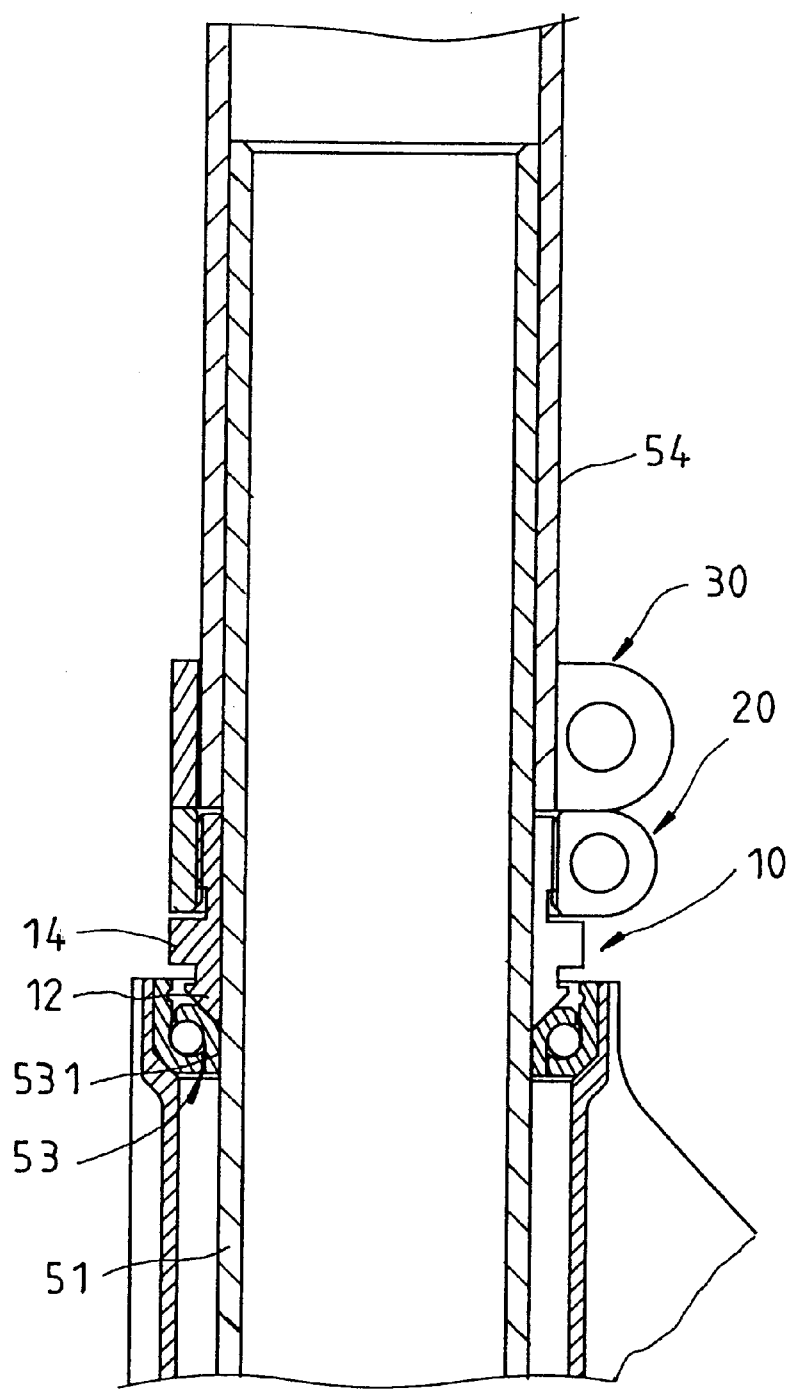
FIG. 4 is a schematic view illustrating adjustment of the position of a movable fitting element of the preferred embodiment.

Referring to FIG. 4, a wrench (not shown) can be used to clamp the clamping portion 14 of the movable fitting element 10 and turn the movable fitting element 10 to rotate such that, by means of the inter-engageable inner and outer threads 13, 24 of the movable and fixed fitting elements 10, 20, the movable fitting element 10 may displace along the axis of the steering spindle 51 to thereby adjust the pressure of the press portion 12 of the movable fitting element 10 on the inner ring 531 of the bearing 53, i.e., the tightness between the steering spindle 51 and spindle sleeve 52 so that the control rod 54 can smoothly control rotation of the steering spindle 51, i.e., control smooth rotation of the front wheel of the scooter.

The invention is characterized in that, by virtue of the inter-engageable inner and outer threads 13, 24 of the movable and fixed fitting elements 10, 20, when the fixed fitting element 20 is locked tightly on the movable fitting element 10, the movable fitting element 10 can be rotated by using a wrench so that the movable fitting element 10 can axially displace relative to the fixed fitting element 20 to force the press portion 12 of the movable fitting element 10 to press against the inner ring 531 of the bearing 53, thereby completing pivotal connection between the steering spindle 51 and spindle sleeve 52. The construction is simple and assembly easy. Besides, it is not necessary to form a thread on the outer wall of the top end of the steering spindle 51. Thus, manufacturing costs can be reduced.

Certainly, the improved structure for the steering spindle securing device of this invention is not limited to scooters and may be adapted for use in pivotal connection between a front fork and a spindle sleeve of a conventional bicycle.

Although the present invention has been illustrated and described with reference to the preferred embodiment thereof, it should be understood that it is in no way limited to the details of such embodiment but is capable of numerous modifications within the scope of the appended claims.

What is claimed is:

1. A structure for a steering spindle securing device, comprising:

a movable fitting element which is substantially tubular and is mounted on a steering spindle of a conventional bicycle or scooter, said movable fitting element having a notch extending axially along a peripheral wall of a body thereof, one end of said movable fitting element having a generally wedge-shaped press portion for abutting against an inner ring of a bearing of a front head bowl of the bicycle or scooter, an outer annular wall thereof being provided with an outer thread; and a fixed fitting element which is generally tubular and has an inner annular wall provided with an inner thread for engaging said outer thread on said movable fitting element, said fixed fitting element having a notch extending axially along the peripheral wall of a body thereof, two sides of said notch projecting outwardly to form lugs, respectively, each of said lugs having a retaining hole, said two retaining holes extending transversely through said notch for extension and locking of a retaining element such that said lugs can be fastened together;

whereby said fixed fitting element can be locked tightly on said movable fitting element, said movable fitting element being rotatable to cause said movable fitting element to displace along an axis of the steering spindle of the bicycle or scooter.

2. The structure for a steering spindle securing device of claim 1, wherein said retaining holes in said fixed fitting element include a screw hole and an eyelet hole respectively, said retaining element being a screw bolt lockable into said eyelet hole and said screw hole.

3. The structure for a steering spindle securing device of claim 1, wherein an outer wall of said movable fitting element is provided with a clamping portion for clamping by a wrench to rotate said movable fitting element to rotate.

* * * * *